United States Patent [19]
Menon et al.

[11] Patent Number: 5,933,840
[45] Date of Patent: Aug. 3, 1999

[54] GARBAGE COLLECTION IN LOG-STRUCTURED INFORMATION STORAGE SYSTEMS USING AGE THRESHOLD SELECTION OF SEGMENTS

[75] Inventors: Jaishankar Moothedath Menon; Larry Joseph Stockmeyer, both of San Jose, Calif.

[73] Assignee: International Business Machines Corporation, Armonk, N.Y.

[21] Appl. No.: 08/859,803

[22] Filed: May 19, 1997

[51] Int. Cl.⁶ .................................................. G06F 17/30
[52] U.S. Cl. ........................................... 707/206; 707/205
[58] Field of Search ..................................... 707/205, 206

[56] References Cited

U.S. PATENT DOCUMENTS

| | | | |
|---|---|---|---|
| 4,121,286 | 10/1978 | Venton et al. | 364/200 |
| 4,775,932 | 10/1988 | Oxley et al. | 364/200 |
| 4,961,137 | 10/1990 | Augusteijn et al. | 364/200 |
| 5,025,367 | 6/1991 | Gurd et al. | 364/200 |
| 5,109,336 | 4/1992 | Guenther et al. | 395/425 |
| 5,136,706 | 8/1992 | Courts | 395/600 |
| 5,258,984 | 11/1993 | Menon et al. | 371/10.1 |
| 5,301,297 | 4/1994 | Menon et al. | 395/425 |
| 5,321,834 | 6/1994 | Weiser et al. | 395/600 |
| 5,355,483 | 10/1994 | Serlet | 395/650 |
| 5,392,432 | 2/1995 | Engelstad et al. | 395/700 |
| 5,446,901 | 8/1995 | Owicki et al. | 395/700 |
| 5,488,701 | 1/1996 | Brady et al. | 395/182.04 |
| 5,530,850 | 6/1996 | Ford et al. | 707/206 |
| 5,734,861 | 3/1998 | Cohn | 711/134 |
| 5,799,324 | 8/1998 | McNutt et al. | 707/206 |

OTHER PUBLICATIONS

Mendel Rosenblum et al., "The Design and Implementation of a Log–Structured File System", *ACM Transactions on Computer Systems*, vol. 10, No. 1, Feb. 1992, pp. 26–52.

David A. Patterson et al., "A Case for Redundant Arrays of Inexpensive Disks (RAID)", from ACM SIGMOD 88, Jun. 1988, pp. 109–116.

M. Frans Kaashoek et al., "The Logical Disk: A New Approach to Improving File Systems", ACM SIGOPS 93, Dec. 1993, pp. 15–28.

B. McNutt, "Background Data Movement in a Log–Structured Disk Subsystem", *IBM J. Res. Develop.*, vol. 38, No. 1, Jan. 1994, pp. 47–58.

Jai Menon, "A Performance Comparison of RAID–5 and Log–Structured Arrays", *IBM* Research Report, Jan. 3, 1995, pp. 1–34.

*Primary Examiner*—Thomas G. Black
*Assistant Examiner*—Charles L. Rones
*Attorney, Agent, or Firm*—Heller Ehrman White & Mcauliffe

[57] ABSTRACT

An information storage system selects target segments for garbage collection only if their age in the information storage system exceeds an age threshold value and, once past the age threshold, in the order of least utilized segments first. The system determines the age of a segment by determining the amount of time a segment has been located in direct access storage devices (DASD) of the information storage system and considers a segment for garbage collection only after the segment has been located in DASD for the selected age threshold value. From the set of candidate segments, the system chooses one or more for garbage collection in the order in which they will yield the most free space. The free space yield is determined by utilization data, so that the least utilized segments are garbage-collected first.

43 Claims, 5 Drawing Sheets

GARBAGE COLLECTION IN LOG-STRUCTURED INFORMATION STORAGE SYSTEMS USING AGE THRESHOLD SELECTION OF SEGMENTS

BACKGROUND OF THE INVENTION

1. Field of the Invention

This invention relates generally to log-structured information storage systems of direct access storage devices (DASD) and, more particularly, to garbage collection of segments in log-structured storage systems.

2. Description of the Related Art

To store increasing amounts of information, many computers use external information storage systems. These systems can provide improved write performance and data redundancy over conventional disk storage configurations. The external storage systems typically have a dedicated controller that manages read and write operations to the storage system. Such systems can more efficiently store large blocks of information and can provide redundant information storage in a manner that is transparent to the computer.

Some external storage systems maintain information as log-structured files as described in "The Design and Implementation of a Log-Structured File System" by M. Rosenblum and J.K. Ousterhout, ACM Transactions on Computer Systems, Vol. 10 No. 1, February 1992, pages 26–52. In a log-structured file system, information is stored in a direct access storage device (DASD) according to a "log" format, as if being written to an infinite or near-infinite tape. A DASD may comprise, for example, a magnetic disk. Typically, new information is stored at the end of the log rather than updated in place, to reduce disk seek activity. As information is updated, portions of data records at intermediate locations of the log become outdated.

One type of log-structured storage system is called a log structured array (LSA), obtained by combining the log-structured file system architecture with a disk array architecture such as the well-known RAID architecture described in "A Case for Redundant Arrays of Inexpensive Disks (RAID)", Report No. UCB/CSD 87/391, December 1987, Computer Sciences Division, University of California, Berkeley, Calif. In an LSA system, an LSA control unit manages information storage to write updated data into new disk locations rather than writing new data in place. Large amounts of updated data are collected in LSA control unit memory and are written to disk storage at the same time. As updated information (called "live" data) is stored to disk, the disk locations of the old data are no longer valid. The old data is referred to as "garbage" or "dead" data. Units of disk storage, called segments, thereby become partially empty. To ensure a constant supply of disk space for storage of updated information, the LSA controller periodically performs a garbage collection process in which partially empty segments are compacted into a fewer number of completely filled segments, thereby creating a number of completely empty segments that are ready for updated information.

Reading and writing into an LSA occurs under management of the LSA control unit, also called a controller. An LSA control unit can include resident microcode that emulates logical devices such as DASD disk drives, or tape drives. In this way, the physical nature of the external storage subsystem can be transparent to the operating system and to the applications executing on the computer processor accessing the LSA. Thus, read and write commands sent by the computer processor to the external information storage system would be interpreted by the LSA controller and mapped to the appropriate DASD storage locations in a manner not known to the computer processor. This comprises a mapping of the LSA logical devices onto the actual DASDs of the LSA.

In an LSA, data is stored among the multiple DASDs of the LSA and the memory in which updated data is temporarily collected, or buffered, is called the input write buffer. The input write buffer typically contains one segment's worth of data and also is referred to as the memory segment. When the LSA input write buffer is filled, the new data stored in the buffer is recorded sequentially back into the DASDs of the LSA. Such an arrangement eliminates most DASD seek operations during data recording.

As an illustration, consider an LSA consisting of a group of disk drive DASDs, each of which includes multiple disk platters stacked into a column. The recording area of each DASD in a group is divided into multiple areas having a logical (virtual) designation called a segment-column. For example, a segment-column of a DASD in an LSA is an area comprising all of the same-position tracks on all platters of the DASD. A segment is the collection of all segment-columns from all the DASDs in the LSA. Thus, a disk drive DASD unit in an LSA typically includes as many segment-columns as there are tracks on a disk platter. For example, if an LSA includes five DASD units, then the first track on each of the DASD platters in the first DASD is a segment-column, the first track on each of the DASD platters in the second DASD is another segment-column, and so forth. The first segment-column from each of the five DASDs in the LSA would form one logical segment. Therefore, an LSA typically has as many segments as there are segment-columns in a single disk drive unit.

Many conventional multiple-platter disk drive systems number tracks sequentially from platter to platter of a disk drive unit. That is, conventionally the innermost track on the first platter is track 1, the innermost track on the second platter is track 2, and so forth such that the innermost track on the last (fifth) platter is track 5. Thus, the second track on the first platter of a five-platter disk drive unit would be track 6, the second track on the second platter would be track 7, the third track on the first platter would be track 11, the third track on the second platter would be track 12, and so forth. Thus, the first LSA segment would comprise the collection of the innermost track on each platter (the first segment-column) from the first disk drive unit, the first segment-column from the second drive, and so forth through the fifth drive, the second LSA segment would comprise the collection of the second segment-column (second track) from all of the disk drives, and so forth. Except for the track numbering convention, the recording area relationship between segments and segment-columns would be as described above.

One segment-column per segment in an LSA is typically used to store parity information that is produced from a logical exclusive-OR operation on data stored in the remaining data segment-columns of the segment. For improved performance, the segment-columns containing the parity information are not all stored on the same disk drive unit, but are rotated among the disk drive units. This ensures accurate data rebuild in the event of a disk failure.

Whether an LSA stores information according to a variable length format such as a count-key-data (CKD) architecture or according to a fixed block architecture, the LSA storage format of segment-columns is mapped onto the physical storage space in the disk drive units so that a logical track of the LSA is stored entirely within a single segment-column mapped onto a disk drive unit of the array. The size of a logical track is such that many logical tracks can be stored in the same LSA segment-column. It should be understood that the description above of a segment-column containing all same-position tracks of all platters of a DASD is for illustration, and other definitions of segment-column are possible.

Because the input write buffer of an LSA such as described above typically has a storage capacity of approximately one logical segment, the data in the write buffer and the parity segment-column computed from it together comprise approximately one segment's worth of information. When the input write buffer becomes substantially full, the LSA controller computes the parity segment-column for the data in the write buffer and records the data and parity information into the next available empty segment mapped onto the array. That is, the first segment-column of the input write buffer is written into the first segment-column of the next available segment, the second segment-column of the input write buffer is written into the second segment-column of the same next segment, the third segment-column of the input write buffer is written into the third segment-column of the same next segment, and the process is repeated to the last segment-column.

A block that contains data values for which there have been later write operations, meaning that the data values have been superseded, is available for recording new data. As noted above, such superseded data is referred to as garbage (or "dead") and the corresponding disk area is referred to as a garbage block. A block containing data values that have not been superseded contains valid data and is referred to as a clean block or a live block. After a number of data modifying write operations have been carried out in disk drive units forming a log structured array, there likely will be at least one segment's worth of garbage blocks scattered throughout the array. By consolidating live blocks with valid data, a fully empty segment can be created, which will then be available for receiving new (live) data values from the input write buffer.

Creating empty segments is important because, for a controller of an LSA to continue write operations as new data values are received from the input write buffer, new empty segments in the disk drive units must be produced continually. New empty segments are typically produced by identifying live blocks within segments containing live data and moving the live data from these segments to consolidate them in a smaller number of full segments. Such consolidation creates one or more segments that contain only garbage blocks. A segment that is entirely garbage is therefore empty and is available for recording one segment's worth of data from the write buffer, as described above. As noted above, the process of consolidating noncontiguous live blocks so as to consolidate live data and create empty segments is called garbage collection.

Garbage collection is usually done by first locating a target segment having the fewest number of live data blocks (and therefore the largest number of garbage blocks) in a disk drive unit of the LSA. The live data values of the target segment are read into a temporary storage buffer. The target segment therefore becomes completely empty. Next, another target segment is identified and the live data from that target segment is read into the temporary storage buffer. This process of locating target segments and reading their live data blocks into the temporary storage buffer is repeated segment by segment until the temporary storage buffer is full. Typically, several target segments must be processed before the temporary storage buffer will be full. After the temporary storage buffer becomes full, the data from the buffer is recorded back into an empty segment in the disk storage array.

As garbage collection proceeds, live data from the various target segments is read into the temporary storage buffer, the buffer fills up, and the live data is stored back into an empty segment of the DASD array. After the live data in the temporary storage buffer is written back into the DASD array, the segments from which the live data values were read are designated as being empty. In this way, live data is consolidated into a fewer number of completely full segments and new empty segments are created. Typically, garbage collection is performed when the number of empty segments in the array drops below a predetermined threshold value.

The way in which target segments are selected for the garbage collection process affects the efficiency of LSA operation. The LSA controller must determine how to collect segments when performing the garbage collection. Two algorithms are used conventionally, one called the "greedy" algorithm and one called the "cost-benefit" algorithm. The greedy algorithm selects target segments by determining how much free space will be achieved for each segment processed and then processing segments in the order that will yield the most amount of free space. The cost-benefit algorithm compares a cost associated with processing each segment against a benefit and selects segments for processing based on the best comparisons.

More particularly, the greedy algorithm selects segments with the smallest utilization first and moves the live tracks from partially-filled segments to a target segment in a pool of empty segments. A problem with the greedy algorithm is that the process might take a segment too soon. That is, by waiting longer for a partially-filled segment to get older, the segment might then be even more empty. If the segment is more empty, fewer live data tracks will need to be moved, making the garbage collection process more efficient.

In the cost-benefit algorithm, a target segment is selected based on how much free space is available in the segment and how much time has elapsed since the segment was last filled with new information. The elapsed time is referred to as the age of the segment. In the cost-benefit algorithm, the age of a segment is defined to be the age of the youngest live track in the segment. For example, age might be indicated by a time stamp value associated with a track when it is placed in the LSA input write buffer. A benefit-to-cost ratio is calculated for each segment, such that the ratio is defined to be:

$$\frac{\text{benefit}}{\text{cost}} = \frac{(1-u)a}{1+u};$$

where u is called the utilization of the segment; (1−u) is defined to be the percentage amount of free space in the segment, also called the "dead" fraction; and a is the age of the segment as defined above. The cost-benefit algorithm orders segments by their benefit-to-cost ratio and selects as target segments those with the largest ratios. The numerator in the ratio represents the benefit to selecting the segment, being the product of the dead fraction (1−u) and the age a. The denominator (1+u) represents the cost of selecting the segment for garbage collection, because the whole segment (all tracks) is read into the buffer and a fractional part u of the segment (the live tracks) is written back to DASD.

A problem with the cost-benefit algorithm is the overhead associated with computing the benefit-to-cost ratios for each segment in the LSA and maintaining an ordering of the segments according to their benefit-to-cost ratios. The overhead quickly becomes prohibitive as the system is scaled upward in size. In particular, two segments can switch cost-benefit ratios, thereby switching their ordering for garbage collection, simply with the passage of time and without regard to any change in actual utilization rate. In this way, a segment may have to be re-ordered even though its utilization hasn't changed. Note that the benefit (numerator above) is a function of age. Thus, a segment may be selected even though efficiency considerations might suggest that other segments with smaller utilization rates should be selected for garbage collection first.

From the discussion above, it should be apparent that there is a need for an information storage system that efficiently manages information storage and performs garbage collection. The present invention fulfills this need.

SUMMARY OF THE INVENTION

The present invention manages an information storage system of a computer to provide a system in which target segments are selected for garbage collection only if their age in the information storage system exceeds an age threshold value and, once past the age threshold, in the order of least utilized segments first. The system determines the age of a segment by determining the amount of time a segment has been located in direct access storage devices (DASD) of the information storage system and considers a segment for garbage collection only after the segment has been located in DASD for the selected age threshold value. From the set of candidate segments, the system chooses one or more for garbage collection in the order in which they will yield the maximized, most free space. The free space yield may be determined by utilization data. In this way, efficiency of garbage collection is increased with minimal overhead for the information storage system.

An information storage system constructed in accordance with the invention performs better than either the greedy algorithm or the cost-benefit algorithm, for the case where performance is measured by the average amount of free space produced per garbage-collected segment. In addition, the age threshold decision process of the invention can be implemented at less cost than the cost-benefit algorithm. Moreover, a system constructed in accordance with the invention can be scaled so that the ordering of segments according to desirability for garbage collection is maintained regardless of the size of the system.

Other features and advantages of the present invention should be apparent from the following description of the preferred embodiment, which illustrates, by way of example, the principles of the invention.

DESCRIPTION OF THE PREFERRED EMBODIMENT

Figure 1:
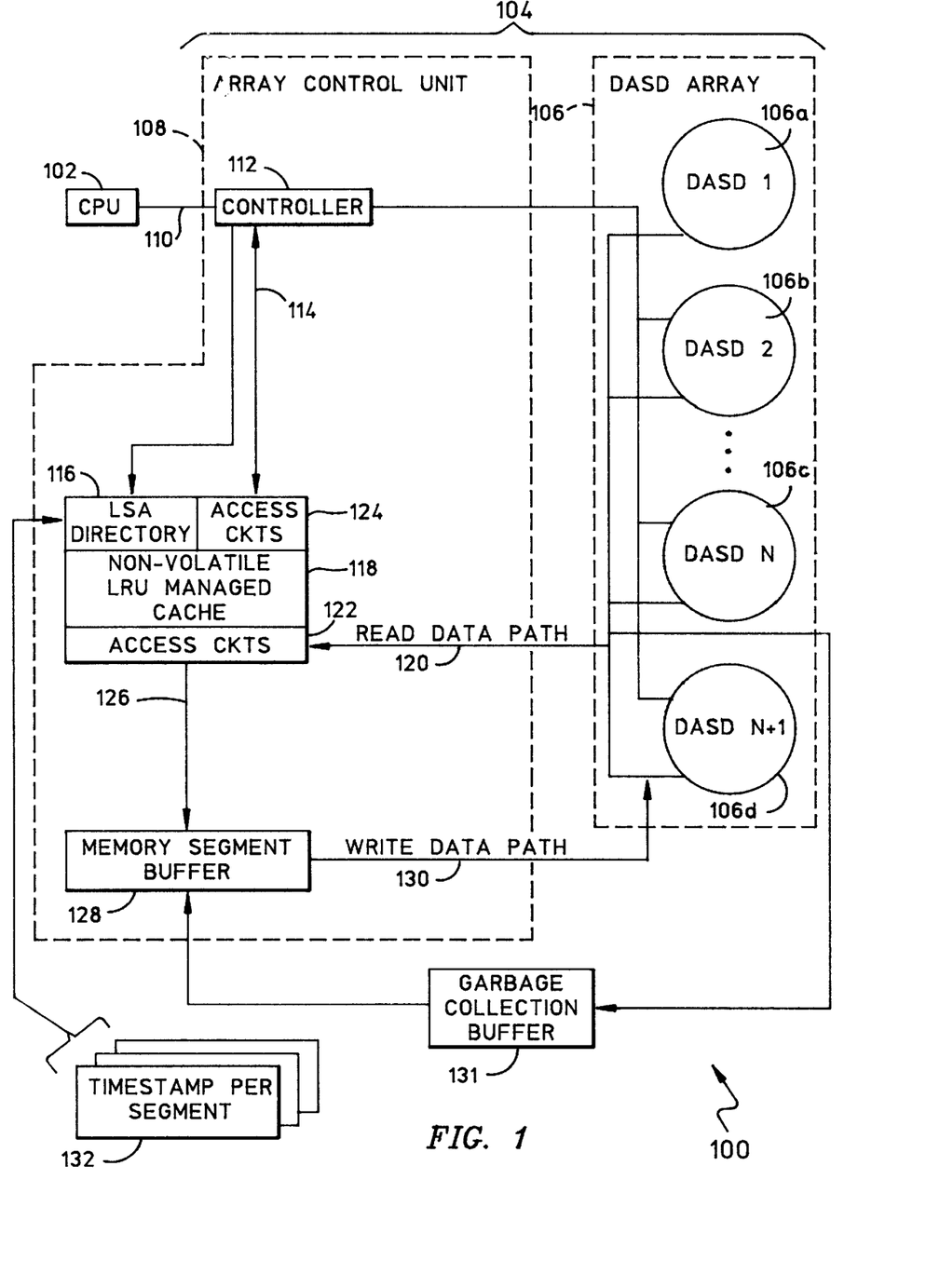
FIG. 1 is a representation of a computer system constructed in accordance with the present invention.

FIG. 1 shows a preferred embodiment of a computer system 100 constructed in accordance with the present invention. The system 100 includes a processor 102 or host computer that communicates with an external information storage system 104 having N+1 direct access storage devices (DASD) in which information is maintained as a log-structured array (LSA). In FIG. 1, an array 106 comprising four DASDs 106a, 106b, 106c, and 106d is shown for illustration, but it should be understood that the DASD array may include a greater or lesser number of DASD. A control unit 108 controls the storage of information so that the DASD array 106 is maintained as an LSA. Thus, the DASD recording area is divided into multiple segment-column areas and all like segment-columns from all the DASDs comprise one segment's worth of data. The control unit 108 manages the transfer of data to and from the DASD array 106 so that periodically it considers segments for garbage collection if their age in the array exceeds an age threshold value and selects target segments according to the least utilized segments first. Thus, utilization information for a segment is examined only if the segment is past the age threshold value. This reduces the processing overhead for the control unit 108.

LSA OPERATIONS

The processor 102 includes (not illustrated): one or more central processor units, such as a microprocessor, to execute programming instructions; random access memory (RAM) to contain application program instructions, system program instructions, and data; and an input/output controller to respond to read and write requests from executing applications. The processor 102 may be coupled to local DASD (not illustrated) in addition to being coupled to the LSA 104. Typically, an application program executing in the processor 102 may generate a request to read or write data, which causes the operating system of the processor to issue a read or write request, respectively, to the LSA control unit 108.

When the processor 102 issues a read or write request, the request is sent from the processor to the control unit 108 over a data bus 110 and is received in the control unit by a controller 112. In response, the controller produces control signals and provides them over a controller data path 114 to an LSA directory 116 and thereby determines where in the LSA the data is located, either in a non-volatile LSA data cache 118 or in the DASD 106. The LSA controller 112 comprises one or more microprocessors with sufficient RAM to store programming instructions for interpreting read and write requests and for managing the LSA 104 in accordance with the present invention.

Data is transferred between the processor 102 and the LSA 104 during read operations over a path including a read data path 120, DASD access circuits 122, the LSA data cache 118, controller access circuits 124, the controller data path 114, the controller 112, and the data bus 110. Data is transferred during write operations over a path including the data bus 110, the controller 112, the controller data path 114, the controller access circuits 124, the LSA data cache 118, the DASD access circuits 122, a segment data path 126, an accumulating memory segment input write buffer 128, and a DASD write path 130.

The data cache 118 permits delay of write operations on modified data tracks to the memory segment 128 for purposes of maintaining seek affinity. More particularly, if write operations to adjacent tracks are received, then all modified data in logically adjacent tracks will be moved into the memory segment 128 at the same time so they are stored in the same segment-column. This helps keep together tracks that are adjacent in the data cache so they will be adjacent when moved into the DASD array, thereby preserving seek affinity. The advantages and operation of the data cache 118 are described in greater detail in U.S. Pat. No. 5,551,003 issued Aug. 27, 1996 and assigned to International Business Machines Corporation.

Preferably, the LSA data cache 118 is managed as a least-recently-used cache, so that data is queued in the cache, with the most recently stored data at the top (or front) of the queue. In particular, the LSA data cache 118 is organized with clean data tracks in one LRU list and dirty tracks in another LRU list. The clean LRU list specifies tracks containing information wherein the data in the LSA cache is the same as the data in the DASD array, and the dirty LRU list specifies tracks containing modified data wherein data is different from the data in the DASD array.

A basic operation of the storage system 104 is to write a particular track so as to change the contents of the track. In general, such live data tracks are first placed in the non-volatile data cache memory 118 of the LSA control unit 108. When the fraction of the cache occupied by modified tracks exceeds a predetermined value, the controller 112 logically moves a set number of modified tracks to the memory segment 128 by assigning them there. After one segment's worth of live tracks are moved into the memory segment, the tracks are written into contiguous locations of the DASD array 106. It should be understood that the operation of the data cache 118 is transparent to the processor 102 and therefore some operations of the storage system 104 will be described from the perspective of the processor, without reference to the data cache. Although the inclusion of a data cache 118 as described above can improve the overall performance of an LSA system, it should be understood that the inclusion of a data cache and the details of its implementation are not essential to the invention.

WRITE OPERATIONS, DESTAGING, & GARBAGE COLLECTION

The smallest unit of data that can be written by the processor 102 is called a track, and a predetermined number of tracks comprise a segment. At any time, a track is live, or current, in only one segment. In all other segments, the track is outdated, also referred to as being a dead track. From the perspective of the processor 102, a live data track is initially stored into controller memory (such as the data cache 118 or the input memory segment write buffer 128) comprising a segment s0 that initially is empty. That is, the segment s0 resides in the controller memory as the segment is filled.

If a track k is being written into the segment s0 of controller memory and if the track k was previously live in some other DASD segment s in the DASD 106 before the write operation, then the track k becomes dead in the segment s and becomes live in the controller segment s0 being filled. This continues until the segment s0 in the LSA controller memory is filled to capacity, at which time the segment s0 is destaged, meaning that it is moved from the memory segment buffer 128 and written to the DASD array 106. Another segment's worth of data is then filled in the controller memory and the process repeats until the next destage operation.

As data writing proceeds from LSA data cache memory to DASD in this manner, the DASD storage in the LSA becomes fragmented. That is, after several sequences of destaging operations, there can be many DASD segments that are only partially filled with live tracks and otherwise include dead tracks. This affects an LSA operating statistic referred to as utilization.

At any time, the utilization of a segment is the fraction of the segment containing live tracks. Thus, if a segment contains L live tracks and if the segment capacity is C tracks, then the utilization of the segment is given by $$\text{Utilization} = L/C.$$

The writing process described immediately above will eventually deplete the empty segments in the DASD array 106. Therefore, a garbage collection process (described further below) is performed to create empty segments. Garbage collection is carried out by choosing a certain number of partially-filled target segments in DASD and compacting the live tracks in these segments into a fewer number of full segments, thereby creating empty segments. For example, if garbage collection is performed on three partially empty segments, and each has a ⅔ utilization rate, then the live tracks can be collected and reorganized into two full segments and one completely empty segment that is ready to receive data from the LSA input write buffer 128. Thus, a net increase of one empty segment is created by the garbage collection process.

In the preferred embodiment, the target segments are collected in a garbage collection buffer 131 for compaction into the segment buffer 128. Alternatively, the garbage collected segments can be compacted directly into the segment buffer. The segment buffer 128 contains at least two physical buffers, each of which can hold one segment of data. One physical buffer collects newly written live tracks that are received over the data path 126. Another separate physical buffer collects live tracks that were taken from garbage collected segments for the purpose of compaction, for example, these tracks are received from the garbage collection buffer 131. When one of these buffers is filled to capacity, the contents of the buffer are written to an empty segment in the DASD array. Thus, in the preferred embodiment, newly-written tracks are placed into segments separate from segments used for garbage-collected tracks. The garbage collection process is typically a low priority, background process carried our periodically by the controller 112.

THE ARRAY CONTROL UNIT

As noted above, the LSA control unit 108 of the preferred embodiment includes both a non-volatile LSA data cache 118 and a memory segment buffer 128. The memory segment buffer contains sufficient data storage to contain at least two segment of data, but preferably contains sufficient storage to contain several segments of data. The LSA data cache 118 stores both updated logical tracks of data received from the processor 102 and clean logical tracks read from the DASD array 106.

The LSA Controller Operation

The controller 112 includes microcode that emulates one or more logical devices so that the physical nature of the external storage system (the DASD array 106) is transparent to the processor 102. Thus, read and write requests sent from the processor 102 to the storage system 104 are interpreted and carried out in a manner that is otherwise not apparent to the processor. In this way, one or more logical (virtual) devices are mapped onto the actual DASDs of the array 106 by the array control unit 108.

Because the controller 112 maintains the stored data as an LSA, one or more logical tracks can be stored entirely within a segment-column of one of the DASDs 106a, 106b, 106c, 106d. Over time, the location of a logical track in the DASD array can change. The LSA directory 116 has an entry for each logical track, to indicate the current DASD location of each logical track. Each LSA directory entry for a logical track includes the logical track number, the actual DASD drive number and segment-column number within the DASD, the starting sector within the column at which the logical track starts, and the length of the logical track in sectors.

When the controller 112 receives a read request for data in a logical track, it determines the logical track in which the data is stored, examines the LSA directory 116, and determines the DASD number, starting sector, and length in sectors to which the logical track is currently mapped. The controller then reads the relevant sectors from the corresponding DASD unit of the N+1 units in the array 106. When it receives a write request, the controller 112 first accumulates the data to be written in the memory segment buffer 128, which can store N+1 segment-columns to form one complete segment. Each segment comprises N segment-columns of data (user information) and one segment-column of parity data. When the memory segment is full, a parity segment-column is generated by performing an exclusive-OR operation over all of the N data segment-columns in the segment. Next, the N+1 segment-columns are written to an empty segment in the DASD array 106, and the LSA directory entries for all logical tracks that were written to DASD from the memory segment are updated to reflect the new DASD locations.

Because of the updating and deletion of logical tracks, gaps in the DASD segments occur. Therefore, to ensure that an empty segment is always available in the DASD array 106, the array control unit 108 periodically performs the garbage collection process on segments in the LSA. In the garbage collection process generally, a subset of the DASD array segments is selected for garbage collection and DASD tracks in the segments are read and moved into the part of the memory segment buffer used to collect live tracks from the garbage collection process. These "live" logical tracks are rewritten back to DASD when the buffer is full. As a result, space is freed on the DASDs. The freed space is returned to a pool of empty segments that are available for data storage.

GARBAGE COLLECTION ACCORDING TO THE INVENTION

The invention provides a more efficient way of controlling and implementing the garbage collection process. In accordance with the invention, segments must wait in the DASD array for a minimum time equal to an age threshold before they can be considered for garbage collection. Moreover, of the segments that pass the age threshold value and become candidates for garbage collection, only those segments that will yield the most amount of free space are selected. As noted above, garbage collection in accordance with the invention is predicated on the idea that segments recently filled by write operations should wait an age threshold amount of time before they are allowed to become candidates for garbage collection, to give the storage system a reasonable amount of time to rewrite the data before the segment is pulled out of the DASD array for garbage collection. That is, waiting for the age threshold is a recognition that segments in the DASD array for that time are unlikely to get significantly more empty due to rewrite operations.

Segments are candidates for garbage collection only after their age passes the age threshold value. The age of a segment is determined with a time processor destage clock 132 that generates a timestamp value for a segment when that segment is filled in the memory segment buffer 128 and is to be written into the DASD array 106. In particular, the time processor destage clock is initially set to zero. When a segment is filled by track writing operations from the processor 102 (a TW-filled segment), the timestamp associated with that segment is set to the current value of the destage clock, and the destage clock is then incremented by one. The timestamp value, for example, can be maintained in the LSA directory 116. When a segment is filled by live tracks taken from garbage-collected segments (a GC-filled segment), the timestamp associated with that segment is set to the largest timestamp of any segment that contributed a track to it during the garbage collection. In the preferred embodiment, the destage clock is not incremented when a GC-filled segment is written to the DASD array.

The age of a segment is defined as the difference between the current value of the destage clock and the timestamp of the segment itself. Therefore, a GC-filled segment initially has an age equal to the age of the youngest segment that contributed tracks to it. For example, if the destage clock value is currently set to ten, and if the threshold value is set to four, then a segment must have a timestamp value of at most (10–4) or six to be old enough for garbage collection consideration.

In the preferred embodiment, garbage collection in accordance with the present invention depends on a parameter, the age threshold value.

Figure 2:
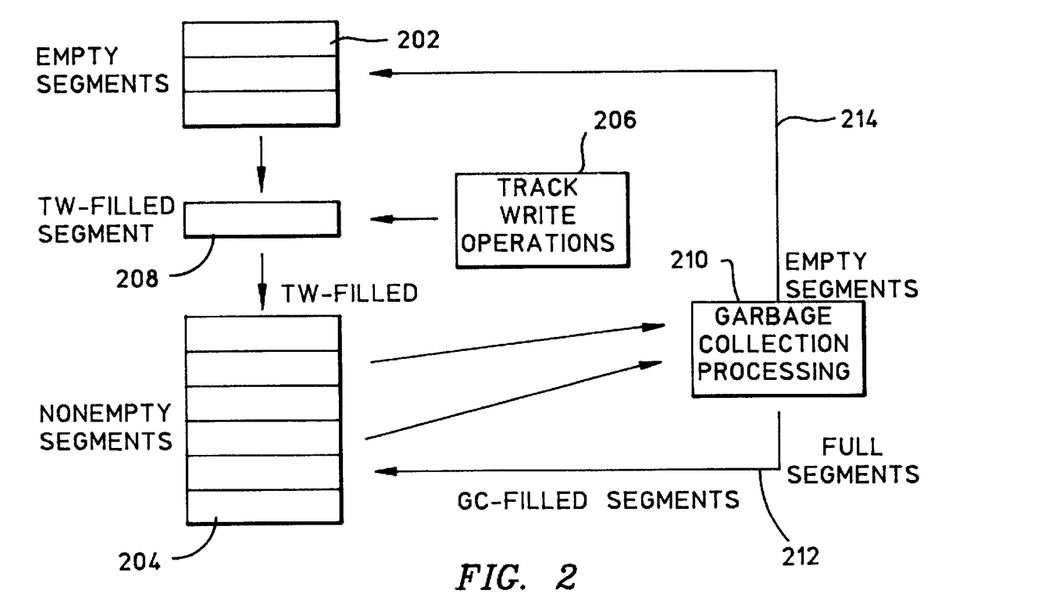
FIG. 2 is a block diagram representation of the garbage collection process performed by the computer system illustrated in FIG. 1.

The garbage collection process in accordance with the invention will be best understood by considering the information storage area in the LSA 104 as a collection of segments whose configuration changes from filled to empty and back again. FIG. 2 illustrates this characterization.

The storage area in the DASD array 106 is organized into segments. These segments may be completely empty (represented in FIG. 2 as a pool or queue of empty segments 202) or may contain a mixture of live data and dead data tracks (represented in FIG. 2 as the pool of non-empty segments 204). As noted above, track write operations are used to completely fill one segment's worth of data in the memory segment buffer, whose contents are then transferred to the next available empty DASD segment. This processing is represented in FIG. 2 by an empty DASD segment receiving one segment's worth of track write operations 206 to become a track-write-filled (TW-filled) segment 208. The TW-filled segment thereby joins the ranks of the non-empty segments. Garbage collection processing 210 therefore is understood as collecting partially-filled non-empty segments 204 and creating both completely filled segments (designated by the GC-filled segments path 212) and segments completely emptied (designated by the empty segments path 214).

Segment Age

Once the age of a segment s passes the age threshold value, the segment will pass the age threshold at all times in the future, until the segment is selected during the garbage collection process. When a GC-filled segment s is filled with live tracks, those tracks were selected from DASD during garbage collection and therefore the segment immediately passes the age threshold value, because the segments that contributed tracks to the segment must have passed the age threshold before they could have been selected. In effect, only the TW-filled segments must wait to pass the age threshold value before selection. An alternative, which gives better performance in certain cases, is also to require the GC-filled segments to wait to pass the age threshold value before selection. In the pseudo-code description to follow, one or the other of these alternatives is chose by setting a flag.

As noted above, the array controller 112 selects target segments for garbage collection only after the segments pass the age threshold value, and selects segments in the order of smallest utilization rate. Utilization u was defined above to be the fraction of live space in the segment, so that (1−u) is defined to be the fraction of free space in the segment, also called the "dead" fraction. If two target segments have the same utilization, then the controller 112 selects the oldest segment for garbage collection. The rationale for making such a selection in the event of a tie for utilization is that older segments tend to have fewer "hot" tracks (tracks accessed repeatedly) than younger segments, and therefore have less potential for decreasing utilization in the future. If two segments eligible for garbage collection have the same utilization, then the preferred embodiment first selects the oldest segment for garbage collection.

PROCESSING WITHIN THE LSA

Figure 3:
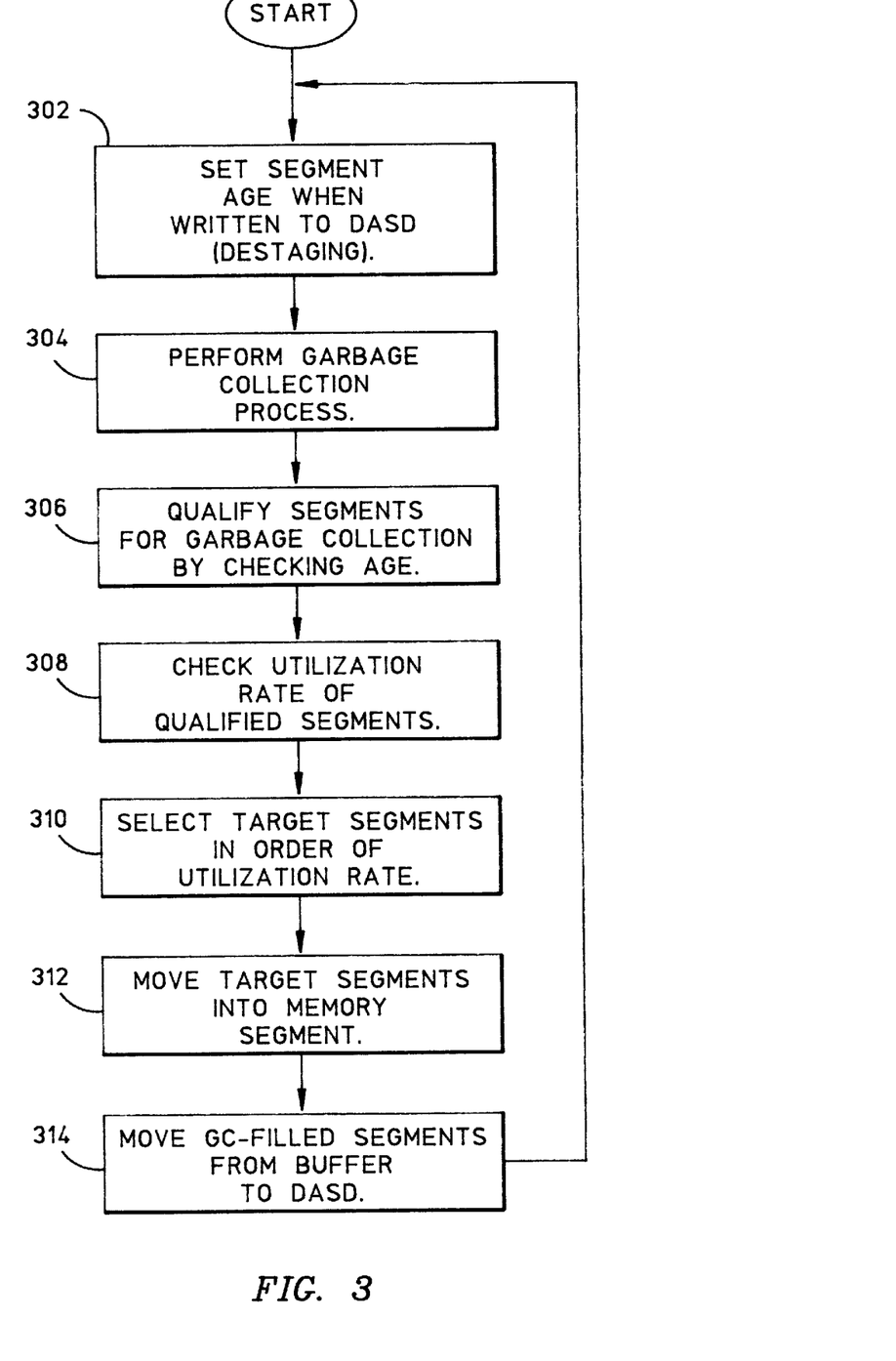
FIG. 3 is a flow diagram representation of the LSA management operations performed by the computer system illustrated in FIG. 1.

FIG. 3 is a flow diagram that illustrates the processing steps performed by the LSA controller 112 in managing the LSA 104.

The flow diagram box numbered 302 indicates that LSA operations begin with the setting of segment age when a segment is written from the LSA memory segment buffer 128 to the DASD array 106. Next, the garbage collection process is initiated at the flow diagram box numbered 304. Those skilled in the art will appreciate that different methodologies exist for determining when garbage collection should be performed, such as the percentage of empty segments in the LSA. These methodologies do not form a part of this invention. Because the LSA controller 112 considers a segment for garbage collection only if its age is greater than the age threshold value, the next processing step is to check segment age, which is represented by the flow diagram box numbered 306. Each segment that is determined to be a candidate for garbage collection is preferably designated in some way, such as by setting a flag in the LSA directory entry for that segment. Next, the utilization of each segment that is older than the age threshold is determined, as represented by the flow diagram box numbered 308.

After all candidate segments are determined, the LSA controller 112 selects the garbage collection target segments in the order of smallest utilization rate, as illustrated by the box numbered 310. That is, the segments with smaller utilization rates will be consolidated in garbage collection before segments with greater utilization rates. Other processing may be encompassed within the box 310 processing. For example, the LSA controller will select the older of two segments if any two segments have equal utilization rates. The next step of the garbage collection process is represented by the flow diagram box numbered 312, which shows that the LSA controller 112 moves segments into the segment buffer for compaction. Lastly, shown by the box numbered 314, the LSA controller 112 moves the GC-filled segments from the memory segment buffer 128 to the DASD array. The LSA processing continues with setting segment age (box 302) as write operations are conducted by the LSA controller. It should be understood that the flow diagram in FIG. 3 is shown as a sequential process for illustration, and that the functions performed by different boxes might be performed concurrently.

AGE-QUEUE BUCKETS

Figure 4:
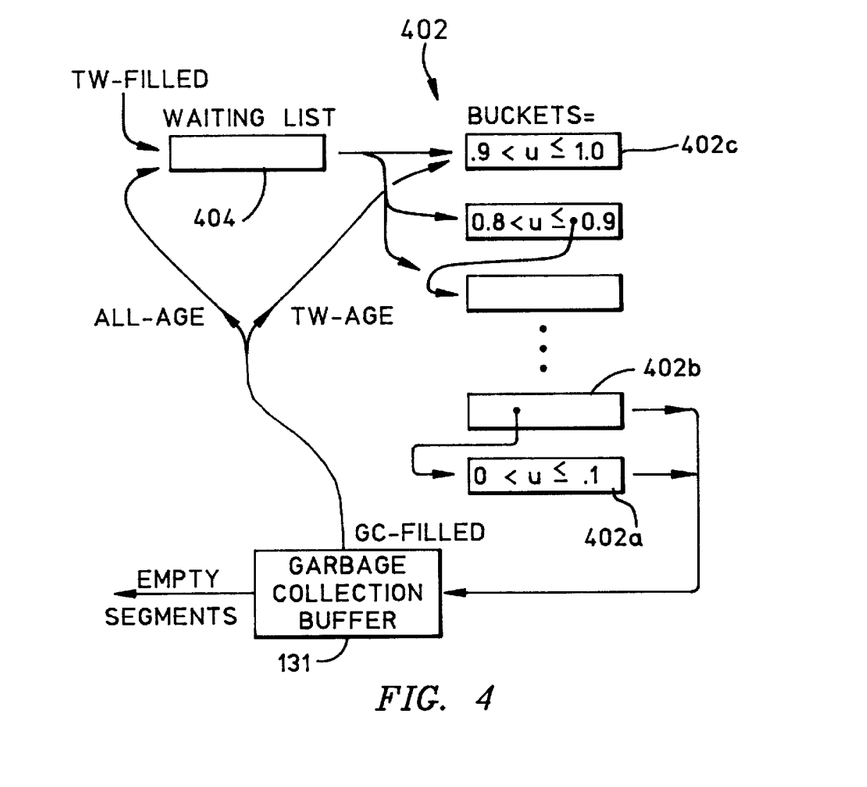
FIG. 4 is a block diagram representation of a bucket process performed by the computer system illustrated in FIG. 1.

Maintaining a list of qualified segments ordered by their utilization could require excessive operating overhead, because a segment will change position in the list every time its utilization changes. An alternative, which gives a more efficient implementation, is to group segments into "buckets" where each bucket covers a range of utilization values. FIG. 4 illustrates information flow in an implementation of the present invention wherein segments eligible for garbage collection are grouped into a collection of utilization intervals or "buckets" that are organized as first-in, first-out (FIFO) queues. It was noted above that the LSA controller 112 selects segments that are past the age threshold according to the lowest utilization rate first. FIG. 4 illustrates that the LSA controller can perform step 310 of the FIG. 3 flow diagram by grouping eligible segments into a series of, for example, ten buckets 402, each bucket corresponding to a one-tenth range of utilization. Thus, one bucket 402a will be designated for segments having utilization rates from zero to 0.1, the next bucket 402b will be designated for buckets with utilization rates greater than 0.1 and less or equal to 0.2, the next bucket will be for rates greater than 0.2 and less than 0.3, and so forth, to a bucket 402c for rates u where $0.9 < u \leq 1$.

It should be understood that the queues 402 may be implemented as LSA controller memory. That is, the buckets 402 may be included in the information of the LSA directory 116, so that the data comprising any selected segment is not physically moved even as the segment is "moved" within its respective queue or is "moved" to a different bucket as its utilization changes. Similarly, the waiting list 404 illustrated in FIG. 4 is a queue in which segments are grouped as they await selection for garbage collection. Whenever the segment at the head of the waiting list passes the age threshold, it is removed from the waiting list and enters the tail of the appropriate bucket determined by its utilization. The waiting list may be implemented as a queue of segment identifiers in controller memory. Thus, segments do not need to be moved physically to change their "location" in a bucket; rather, a segment identifier or name can be moved within the respective buckets.

For each of the queue buckets 402, each of the respective member segments will have passed the age threshold value and will have the utilization corresponding to the bucket in which they have been grouped. Segments having a utilization of zero are a special case and are not placed in any bucket. If a candidate segment is to be selected for garbage collection, then the segment at the head of the lowest-numbered (lowest utilization range bucket) non-empty bucket is used first. Such segments are compacted into the garbage collection buffer 131 (FIG. 4 and FIG. 1). Segments are taken from the head of the waiting list if all buckets are empty, to avoid selection failure if all buckets are empty. An exemplary number of queue buckets is ten; a much smaller number will not sufficiently pick segments with smaller utilization values, and a much larger number (such as one hundred) might require operating overhead such that it will not be sufficiently efficient.

Garbage collection proceeds whenever the value of a garbage collection flag (GC-flag) is set to "on". The process that sets the GC-flag is external to the invention. For example, the process might set GC-flag to "on" when the number of empty segments falls below a certain threshold, and set GC-flag to "off" when the number of empty segments reaches another (larger) threshold. The operation also depends on the value of a GC-wait-flag, which determines whether both GC-filled and TW-filled segments must wait to pass the age threshold, or whether only TW-filled segments must wait. That is, if the controller 112 (FIG. 2) detects that the GC-wait-flag has a value of "true", then it lets GC-filled segments enter the waiting list, just as do TW-filled segments. If the GC-wait-flag has a value of "false", then GC-filled segments are not forced to wait, but the controller lets them become available for selection as soon as their utilization rate drops below one. It has been found that system operation is improved if the GC-wait-flag is set to "true".

PSEUDO-CODE DESCRIPTION OF OPERATION

In accordance with the FIG. 4 implementation of the data storage system, the LSA controller 112 (see FIG. 2), performs operations that can be used by control routines to move segments around the queue buckets. The controller operation will be described in terms of function calls with the following pseudo-code. The function calls used by the controller will include those listed below in Table 1:

TABLE 1

| | |
|---|---|
| enqueue(s,q) | a function that enters a segment s into a particular queue q. |
| dequeue(q) | a function that returns the segment name at the head of a queue q, and removes the named segment from the queue (if the queue q is empty, then this operation returns an "empty" value). |
| remove(s) | a function that removes a segment name s from whatever queue in which the segment is grouped, even if the named segment is not at the head of its respective queue (if the named segment s is not in any of the queues, then this operation has no effect). |
| inspect-TS(q) | a function that returns a timestamp value for a segment s where the segment s is at the head of the queue q, or this operation returns an "empty" value if the queue q is empty. |
| queue(s) | a function that returns the queue in which the named segment s is grouped (if the segment s is not in any queue, this operation returns the value "none"). |
| util(s) | a function that denotes the current utilization of the segment named s. |

In view of the description above and the function calls from Table 1, the following pseudo-code of Table 2 describes the system operation for a given age threshold (AT) value and a given value of GC-wait-flag (comments are enclosed in diagonal slashes):

TABLE 2

START
1. Set Destage clock ← 0.
2. TS(s) ← 0 for 1 <= s <= S   /S is the number of segments in LSA/
3. best-queue ← b             /b is waiting queue/
LOOP: Perform steps 4, 5, 6, and 7 repeatedly and concurrently:
4. If a TW-filled segment s is written to DASD, then
   a. TS(s) ← Destage clock.
   b. Destage clock ← Destage clock + 1.

TABLE 2-continued c. enqueue(s, b)                /put the next segment into b,/
                                   /the waiting list queue/
   d. If inspect-TS(b) => Destage clock - AT or
     if inspect-TS(b) = "empty" then stop.
                                   /put the next segment in the/
                                   /waiting list into the proper bucket/
   e. s ← dequeue(b).
   f. q ← integer[b × util(s)]   /get the bucket into which/
                                   /the segment will go/
   g. If util(s) = 1, then q ← b −1.
   h. enqueue(s,q)                /put the segment into the bucket/
   i. best-queue ← minimum[best-queue, q] /find the lowest numbered/,
                                   /non-empty queue or bucket/
   j. Go to step 4d.
5. If a GC-filled segment s is written to DASD:
   a. TS(s) ← 0.
   b. If GC-wait-flag = "true", then enqueue(s,b),
                                 /if GC-filled segments/
    else[enqueue(s, b −1)].   /should wait, then set TS =0 and/
                                 /put the segment in the waiting list/
6. If utilization changes for a segment s:
   a. If util(s) = 0 then remove(s) and stop. /process empty segment/
   b. If queue(s) = b then stop. /segment is in waiting list;/
                                 /wait for action/
   c. q ← integer [b × util(s)].
   d. If q = queue(s) then stop.
   e. remove(s).
   f. enqueue(s,q).
   g. best-queue ← minimum[best-queue, q].  /use lowest numbered,/
                                 /non-empty queue/
7. If GC-flag = "on" then:
   a. s ← dequeue(best-queue).
   b. If s is not "empty" then go to 7e.
   c. best-queue best-queue + 1.
   d. go to 7a.
   e. If util(s) < 1, then go to 7h.
   f. enqueue(s, b).            /move util =1 segments to back/
                                 /of waiting queue/
   g. go to 7a.
   h. return s.                  /return the segment name/

The first three steps in Table 2 above are part of the storage system initialization, such as might be performed during a power-up stage. Steps 4, 5, 6, and 7 are repeatedly and concurrently performed thereafter.

SELECTING THE AGE THRESHOLD VALUE

Although selection of the age threshold value will depend to some extent on the configuration of a particular information storage system, two methods will next be presented for selecting suitable values.

Average Segment Utilization

The age threshold value can be selected based on average segment utilization information. Such system information can be calculated by LSA controllers automatically, so that processing overhead for the invention is minimized. The average segment utilization is defined to be:

$$ASU=T/CS,$$

for a system with S segments, where each segment has a capacity of C tracks and there are T live tracks. The ASU value is typically a fraction less than 1. The age threshold value can then be calculated by using the relationship:

$$AT=F \times S \times (1-ASU),$$

where F is a fraction between zero and one and S is the number of segments in the system. An exemplary value for F is one-half. Assuming the LSA controller controls the garbage collection scheduling, and assuming it begins garbage collection when the number of empty segments falls to some lower threshold value and halts when the number of empty segments increases to some upper threshold value, then the AT calculation becomes:

$$AT = F \times S \times \{1 - ASU - [(\text{max-empty} - \text{min-empty})/(S - \text{min-empty})]\},$$

where max-empty and min-empty are maximum and minimum numbers, respectively, of empty segments. Typical values are max-empty=50 and min-empty=10 for S=1000.

Dynamic Learning Method

The dynamic learning method selects the age threshold value based on system workload and makes use of the garbage collection utilization (GCU) system statistic defined as the average utilization of segments selected for garbage collection, averaged over a large number of segment selections. The age threshold value is then adjusted according to whether the current GCU is better or worse than the previously computed GCU. Smaller values of GCU are better than larger values. A small GCU means that the garbage collection algorithm is selecting segments that on average have small utilization, that is, yield a large amount of free space.

The dynamic learning method operates according to three parameters; (1) the sample size, which is the number of segment selections over which the GCU is computed; (2) the adjustment step, the amount that the age threshold is changed at each iteration of the method; and (3) the max-AT value, a maximum permitted value of the age threshold. Generally, the sample size should be chosen large enough that the sample provides an accurate value for GCU using the value of age threshold that is in effect during the time that the sample is taken.

Initially, the dynamic learning method begins with an age threshold value of zero and sets a direction parameter to "up" or positive. Next, the method measures the GCU over a predetermined period of time sufficiently long to provide reliable data. The age threshold value is then increased or decreased depending on the value of the direction parameter, positive or negative, whereupon the GCU is recalculated over another period. If the GCU gets worse (increases) over the recalculation period, then the direction parameter is reversed, for example from positive to negative. The direction otherwise is unchanged. The GCU is again calculated, and the process repeats.

The dynamic learning algorithm can be understood in conjunction with the following pseudo-code method steps Table 3:

TABLE 3

1. AT ← 0; Direction ← 1; Old-sum ← ∞.
2. Sum ← 0; Count ← 0.
3. Whenever a segment name s is chosen for garbage collection, or whenever util(s) decreases to 0 as a result of track writing:
4.     Sum ← Sum + util(s);
    Count ← Count + 1.
5. If Count < sample-size, then go to Step 3.
6. If Sum > Old-sum then Direction ← −Direction.
7. AT ← AT + (Direction × Adjustment).
8. If AT < zero, then {AT ← 0; Direction ← 1;
    Old-sum ← ∞; go to Step 2}.
9. If AT > max-AT, then {AT ← max-AT; Direction ← −1;
    Old-sum ← ∞; go to Step 2}.

TABLE 3-continued

10. Old-sum ← Sum.
11. Go to Step 2.

Under a workload for which GCU as a function of the age threshold has only one local minimum, the dynamic learning algorithm will eventually close on a good age threshold value, provided that the period over which the GCU is calculated is sufficiently long and the amount that the age threshold value is increased or decreased is sufficiently small.

Empirical studies are useful in determining optimal values for particular systems.

EMPIRICAL RESULTS

Figure 5:
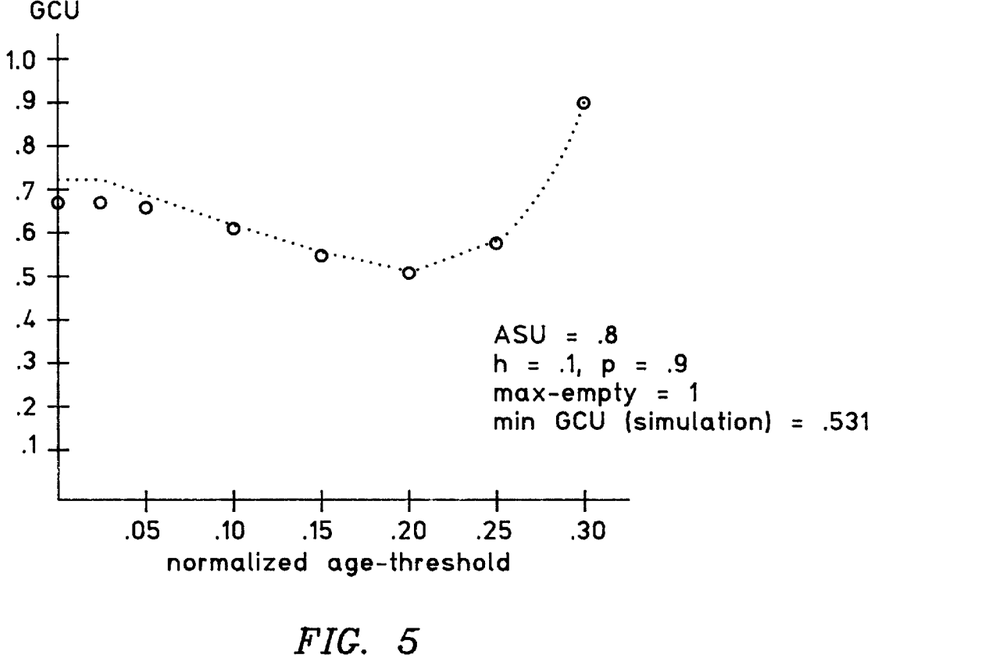
FIG. 5 is a representation of the GCU vs. normalized age threshold value with a max-empty value of one and a volatility specified by h=0.1 and p=0.9.

The performance of a garbage collection algorithm can be measured by its GCU value, defined above as the average utilization of segments selected for garbage collection. Smaller values of GCU are better than larger values, since small average utilization means that a large amount of free space is being produced on average. Simulation and analysis of a storage system shows that, as the age threshold value increases, the GCU rate first stays constant, then decreases and then in creases. FIG. 5 is an illustration of GCU as a function of the normalized age threshold value. The normalized age threshold is defined to be the age threshold divided by the number of segments. FIG. 5 was obtained from analysis and simulation of a system with constant ASU=0.8, with a "hot-and-cold" model of track writing in which a fraction h=0.1 of the tracks are written a fraction p=0.9 of the time, and where one empty segment is produced during each phase of garbage collection (indicated by max-empty=1). The dotted line shows the result of mathematical analysis, and the small circles plot data points obtained from simulation.

From FIG. 5, it can be seen that for a range of age threshold values sufficiently near zero, the selection process in accordance with the invention is essentially the same as the greedy algorithm, because the greedy algorithm will not select a segment based on the smallest utilization rate until the age of the segment has passed the age threshold value. Eventually, the age threshold process will "protect" a segment that the greedy algorithm would have selected. This point is evident from the FIG. 5 graph at the value for which GCU begins to decrease. If the age threshold value is too small, however, the young segments will be collected too soon, before they have fulfilled their potential for rapidly decreasing utilization. As the age threshold value continues to rise, eventually a point of diminishing returns is reached, because the age threshold process will protect too many low-utilization segments, with the consequence that higher utilization segments must be selected.

Figure 6:
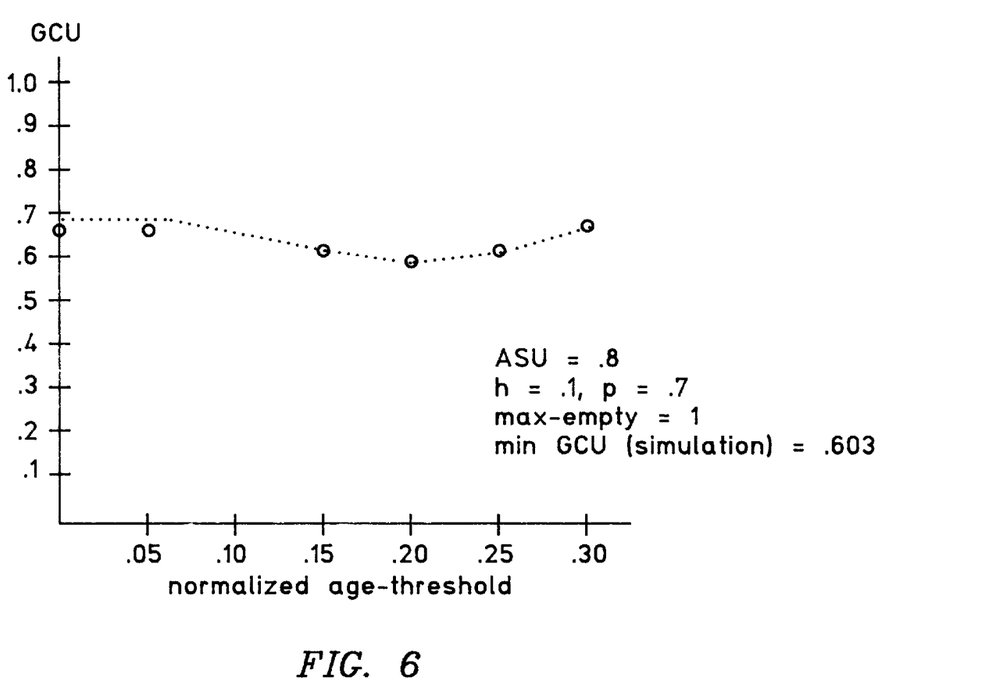
FIG. 6 is a representation of the GCU vs. normalized age threshold value with a max-empty value of one and a volatility specified by h=0.1 and p=0.7.

FIG. 6 shows the GCU as a function of normalized age threshold value for a simulation with a less "hot" mix of tracks. In particular, FIG. 5 is a graph for a situation where h=0.1 and p=0.9, while FIG. 6 is for a situation with h=0.1 and p=0.7; the two drawings show that the change in GCU as a function of age threshold value is smaller for a simulation with less "hot" tracks.

The comparison of FIG. 5 and FIG. 6 is somewhat intuitive as to results, because in the case of uniform track choice, the GCU does not depend on the age threshold value unless the age threshold value is so large that an excessive number of low-utilization segments are kept from being selected because they do not pass the age threshold.

The result from FIG. 5 and FIG. 6, that GCU does not depend greatly on the age threshold value at low degrees of "hot" data, suggests another solution for selection of the age threshold value. The solution is to choose an age threshold value based on a high degree of "hot" data. If the degree of hotness is high, the age threshold value should be close to a true optimal value. If the degree of data hotness is low, then the selection of age threshold value is not critical. Thus, it should be clear from FIG. 5 and FIG. 6 that the age threshold value should be selected at the minimum point of the respective graphs.

FIG. 5 and FIG. 6 provided simulation data where the system permitted at most one empty segment (max–empty= 1) after the initial segment filling process is completed. That is, repeatedly and alternately, the LSA controller creates one empty segment and fills the empty segment by track write operations. That is, this situation is where a garbage collection process and the track writing operations are conducted in parallel and in equilibrium.

Figure 7:
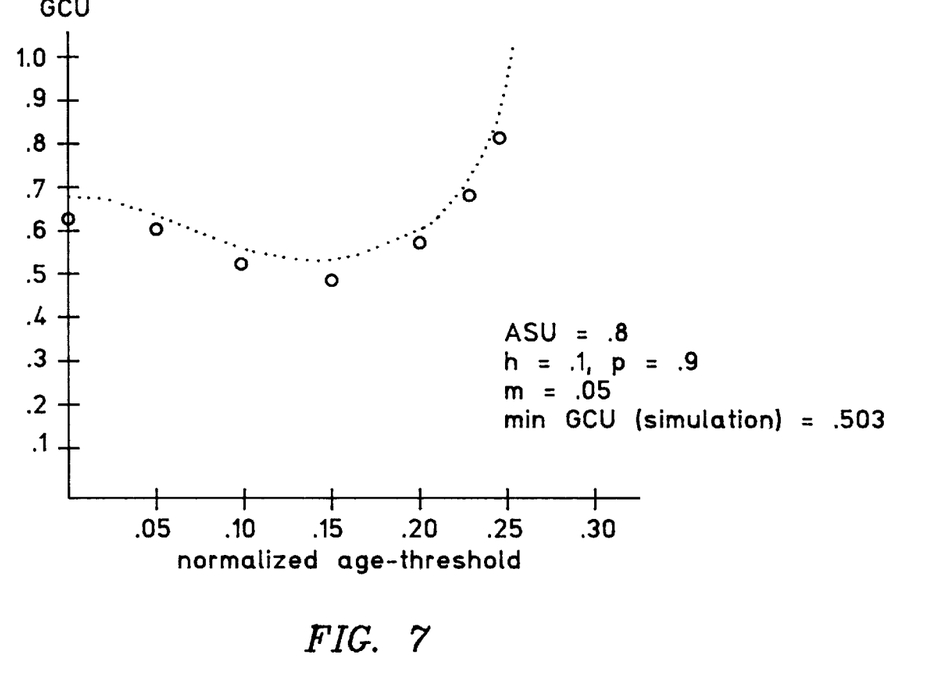
FIG. 7 is a representation of the GCU vs. normalized age threshold value with an m value such that m=0.05 and h=0.1 and p=0.9.
Figure 8:
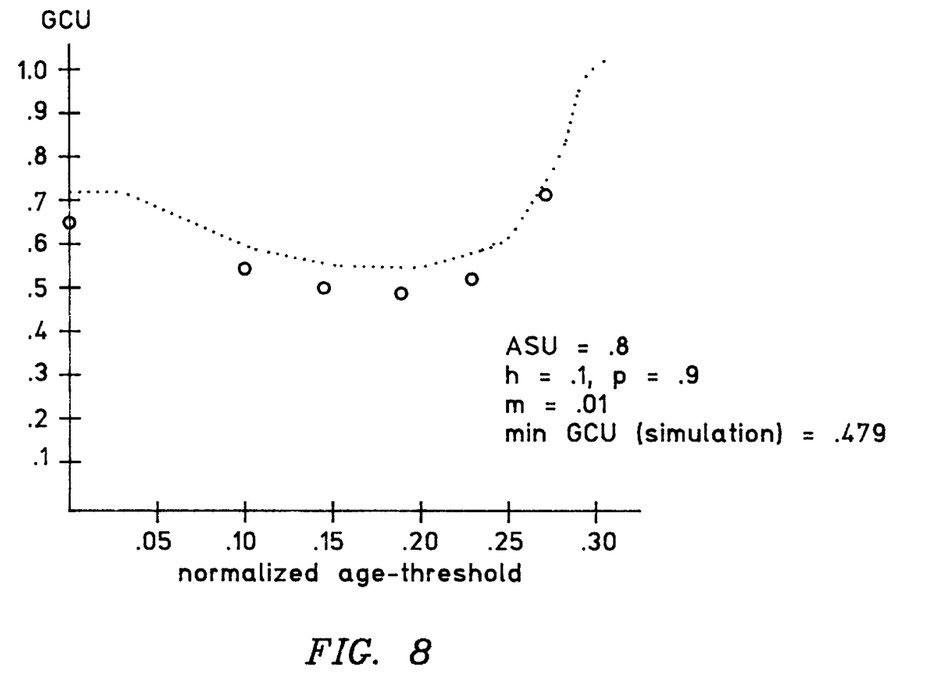
FIG. 8 is a representation of the GCU vs. normalized age threshold value with an m value such that m=0.01 and h=0.1 and p=0.9.

It is also possible to simulate, and is more realistic, to consider the situation where the number of empty segments produced during each phase of garbage collection is greater than one and is some fraction m of the number of segments. FIG. 7 and FIG. 8 show the analysis and simulation for this condition. The cases of FIG. 7 and FIG. 8 differ from the case of FIG. 5 only in that max–empty=1 in FIG. 5, whereas in FIG. 7 m=0.05 and in FIG. 8 m=0.01.

Comparing FIG. 7 with FIG. 5, it is clear that the optimal normalized age threshold value decreases by about the value of m when compared to the max-empty=1 case. That is, with max-empty=1, the optimal normalized age threshold value is 0.196, whereas with m=0.05 (FIG. 7), the optimal normalized age threshold value is 0.145. Similarly, comparing FIG. 8 and FIG. 5, with m=0.01 (FIG. 8), the optimal normalized age threshold value is 0.186, whereas with max-empty=1, the optimal value is 0.196.

ADVANTAGES OF THE INVENTION

Thus, an information storage system selects target segments for garbage collection only if their age in the information storage system exceeds an age threshold value and, once past the age threshold, in the order of least utilized target segments first. The system determines the age of a segment by determining the amount of time a segment has been located in DASD of the information storage system, and then considers a segment for garbage collection only after the segment has been located in the DASD for the selected age threshold value, and then finally chooses one or more of the considered segments for garbage collection in the order in which they will yield the maximized, most free space. In this way, efficiency of garbage collection is increased with minimal overhead for the information storage system.

The present invention has been described above in terms of presently preferred embodiments so that an understanding of the present invention can be conveyed. There are, however, many configurations for disk storage systems and servo control systems not specifically described herein but with which the present invention is applicable. The present invention should therefore not be seen as limited to the particular embodiments described herein, but rather, it should be understood that the present invention has wide applicability with respect to log-structured storage systems generally. All modifications, variations, or equivalent arrangements that are within the scope of the attached claims should therefore be considered to be within the scope of the invention.

We claim:

1. A method for performing a garbage collection process in an information storage system having direct access storage units in which information segments are located, the method comprising the steps of:

selecting an age threshold value;

determining an age value for each segment that indicates the time that segment has been located in a direct access storage device and designating each segment as a candidate for garbage collection if the segment has an age value greater than the age threshold value; and choosing a candidate segment for garbage collection if it will yield a maximized amount of free space.

2. A method as defined in claim 1, wherein the maximized amount of free space is the amount of empty storage space provided by performing garbage collection on the candidate segment having the lowest utilization.

3. A method as defined in claim 1, wherein the step of choosing comprises selecting a candidate segment in accordance with a yield ranking.

4. A method as defined in claim 3, wherein the relative yield ranking comprises a ranking of the candidate segments according to utilization.

5. A method as defined in claim 4, wherein the relative yield ranking comprises a plurality of utilization intervals.

6. A method as defined in claim 3, wherein the step of choosing further comprises selecting between two candidate segments having equal yield ranking by selecting the candidate segment having the greater age value.

7. A method as defined in claim 3, wherein the information segments comprise a plurality of information tracks, and each segment is assigned an age when written from a memory buffer into the direct access storage devices during a destage operation.

8. A method as defined in claim 7, wherein the age of a segment filled by garbage collection is set to the age of the youngest segment that contributed tracks to the filled segment.

9. A method as defined in claim 7, wherein the age of a segment is the difference between a current destage clock value and the destage operation destage clock value of the segment.

10. A method for managing storage of information segments in a computer processing system that stores information in a plurality of direct access storage devices, the method comprising the steps of:

setting the age of a segment filled by track writing operations to a current value of a destage clock;

placing the filled segment at a tail position of a first-in, first-out (FIFO) queue;

designating a segment from a head position of the FIFO queue as a garbage collection candidate if the age of the segment is greater than an age threshold value;

ordering a plurality of designated candidate segments in accordance with their respective free space yield upon garbage collection; and choosing candidate segments for performing a garbage collection process in the order of their relative yield ranking such that candidate segments with lower yield rankings are selected before candidate segments with higher yield rankings.

11. A method as defined in claim 10, wherein the relative yield ranking comprises a ranking of the candidate segments according to utilization.

12. A method as defined in claim 11, wherein the relative yield ranking comprises a plurality of utilization intervals.

13. A method as defined in claim 10, wherein the step of choosing further comprises selecting between two candidate segments having equal yield ranking by selecting the candidate segment having the greater age value.

14. A method as defined in claim 10, wherein the information segments comprise a plurality of information tracks, and each segment is assigned an age when written from a memory buffer into the direct access storage devices during a destage operation.

15. A method as defined in claim 14, wherein the age of a segment filled by garbage collection is set to the age of the youngest segment that contributed tracks to the filled segment.

16. A method as defined in claim 14, wherein the age of a segment is the difference between a current destage clock value and the destage operation destage clock value of the segment.

17. A method for performing a garbage collection process in a computer processing system that stores information segments, the method comprising the steps of:

setting an age threshold value to an initial value of zero;

selecting a garbage collection direction to an up value; determining an initial garbage collection utilization (GCU) measurement value over a predetermined amount of time;

determining an initial age threshold value by performing the steps of:
adjusting the age threshold value by increasing the age threshold value if the garbage collection direction has an up value, and decreasing the age threshold value if the garbage collection direction has a down value,
calculating the GCU value over the time since the last determined GCU value, and
selecting the garbage collection direction to be the opposite of its current value if the calculated GCU value is worse than the last determined GCU value and maintaining the garbage collection direction at its current value if the calculated GCU value otherwise; and responding to a garbage collection command by performing garbage collection on partially-filled segments of the computer processing system according to the steps of:
determining an age value for each segment that indicates the time that segment has been located in a direct access storage device and designating each segment as a candidate for garbage collection if the segment has an age value greater than the age threshold value; and
choosing a candidate segment for garbage collection if it will yield a maximized amount of free space.

18. A method as defined in claim 17, wherein the maximized amount of free space is the amount of empty storage space provided by performing garbage collection on the candidate segment having the lowest utilization.

19. A method as defined in claim 17, wherein the step of choosing a candidate segment comprises selecting a candidate segment in accordance with a yield ranking.

20. A method as defined in claim 19, wherein the relative yield ranking comprises a ranking of the candidate segments according to utilization.

21. A method as defined in claim 20, wherein the relative yield ranking comprises a plurality of utilization intervals.

22. A method as defined in claim 19, wherein the step of choosing a candidate segment further comprises selecting between two candidate segments having equal yield ranking by selecting the candidate segment having the greater age value.

23. A method as defined in claim 19, wherein the information segments comprise a plurality of information tracks, and each segment is assigned an age when written from a memory buffer into the direct access storage devices during a destage operation.

24. A method as defined in claim 23, wherein the age of a segment filled by garbage collection is set to the age of the youngest segment that contributed tracks to the filled segment.

25. A method as defined in claim 23, wherein the age of a segment is the difference between a current destage clock value and the destage operation destage clock value of the segment.

26. A method for determining when a filled segment in a log-structured file information storage system should be subjected to a garbage collection process, the method comprising the steps of:

calculating an age threshold value defined by F×S×{1−ASU−[(max-empty−min-empty)/(S−min-empty)]}, where: 0<=F<=1,ASU=average segment utilization, max-empty is a maximum number of empty segments, min-empty is a minimum number of empty segments, and S is the number of segments in the information storage system; and responding to a garbage collection command by performing garbage collection on partially-filled segments of the computer processing system according to the steps of:
determining an age value for each segment that indicates the time that segment has been located in a direct access storage device and designating each segment as a candidate for garbage collection if the segment has an age value greater than the age threshold value; and
choosing a candidate segment for garbage collection if it will yield a maximized amount of free space.

27. A method as defined in claim 26, wherein the maximized amount of free space is the amount of empty storage space provided by performing garbage collection on the candidate segment having the lowest utilization.

28. A method as defined in claim 26, wherein the step of choosing a candidate segment comprises selecting a candidate segment in accordance with a yield ranking.

29. A method as defined in claim 28, wherein the relative yield ranking comprises a ranking of the candidate segments according to utilization.

30. A method as defined in claim 29, wherein the relative yield ranking comprises a plurality of utilization intervals.

31. A method as defined in claim 28, wherein the step of choosing a candidate segment further comprises selecting between two candidate segments having equal yield ranking by selecting the candidate segment having the greater age value.

32. A method as defined in claim 28, wherein the information segments comprise a plurality of information tracks, and each segment is assigned an age when written from a memory buffer into the direct access storage devices during a destage operation.

33. A method as defined in claim 32, wherein the age of a segment filled by garbage collection is set to the age of the youngest segment that contributed tracks to the filled segment.

34. A method as defined in claim 32, wherein the age of a segment is the difference between a current destage clock value and the destage operation destage clock value of the segment.

35. An information storage system comprising:
a central processing unit;
a plurality of direct access storage devices (DASD) in which segments of information are stored for use by the central processing unit; and
an information storage system controller that determines the DASD locations in which the information segments will be stored, wherein the controller manager periodically performs a garbage collection process for forming empty segments by performing the steps of selecting an age threshold value,
  determining an age value for each segment that indicates the time that segment has been located in a direct access storage device and designating each segment as a candidate for garbage collection if the segment has an age value greater than the age threshold value, and
  choosing a candidate segment for garbage collection if it will yield a maximized amount of free space.

36. A system as defined in claim 35, wherein the maximized amount of free space is the amount of empty storage space provided by performing garbage collection on the candidate segment having the lowest utilization.

37. A system as defined in claim 35, wherein the controller performs the step of choosing by selecting a candidate segment in accordance with a yield ranking.

38. A system as defined in claim 37, wherein the relative yield ranking comprises a ranking of the candidate segments according to utilization.

39. A system as defined in claim 38, wherein the relative yield ranking comprises a plurality of utilization intervals.

40. A system as defined in claim 37, wherein the controller further performs the step of choosing by selecting between two candidate segments having equal yield ranking by selecting the candidate segment having the greater age value.

41. A system as defined in claim 37, wherein the information segments comprise a plurality of information tracks, and each segment is assigned an age when written from a memory buffer into the direct access storage devices during a destage operation.

42. A system as defined in claim 41, wherein the age of a segment filled by garbage collection is set to the age of the youngest segment that contributed tracks to the filled segment.

43. A system as defined in claim 41, wherein the age of a segment is the difference between a current destage clock value and the destage operation destage clock value of the segment.

* * * * *